United States Patent [19]

Balmer

[11] Patent Number: 4,870,252
[45] Date of Patent: Sep. 26, 1989

[54] CONDENSATION CONTROLLER

[76] Inventor: Charles Balmer, 929 S. Dugan Rd., Urbana, Ohio 43078

[21] Appl. No.: 99,014

[22] Filed: Sep. 21, 1987

[51] Int. Cl.[4] .............................................. H05B 1/02
[52] U.S. Cl. .................... 219/331; 219/497; 219/501; 219/330; 374/28; 4/322
[58] Field of Search .............. 219/330, 331, 494, 497, 219/499, 501, 508, 509, 328–329; 4/353, 322, 321; 374/28; 307/117

[56] References Cited

U.S. PATENT DOCUMENTS

| | | | |
|---|---|---|---|
| 2,895,140 | 7/1959 | Starr | 4/353 |
| 3,023,423 | 3/1962 | Jones | 4/353 |
| 3,173,610 | 3/1965 | Feibush et al. | 374/28 |
| 3,250,114 | 5/1966 | Booth | 374/28 |
| 4,167,663 | 9/1979 | Granzow, Jr. et al. | 219/330 |
| 4,242,569 | 12/1980 | Kayser | 219/330 |
| 4,260,876 | 4/1981 | Hochheiser | 219/497 |
| 4,272,986 | 6/1981 | Lowry et al. | 338/35 |
| 4,276,768 | 7/1981 | Dadachanji | 374/28 |
| 4,289,954 | 9/1981 | Brognano et al. | 219/333 |
| 4,459,469 | 7/1984 | Ishima | 219/330 |
| 4,478,080 | 10/1984 | Bruce | 374/28 |
| 4,579,462 | 4/1986 | Rall et al. | 374/28 |

Primary Examiner—M. H. Paschall
Attorney, Agent, or Firm—Donald P. Gillette

[57] ABSTRACT

The temperature of liquid in a tank and of the environment adjacent the tank are measured and a heater in the tank is controlled to heat the liquid if its temperature is sufficiently below that of the environment to cause water vapor in the atmosphere to condense on the outer surface of the tank.

14 Claims, 3 Drawing Sheets

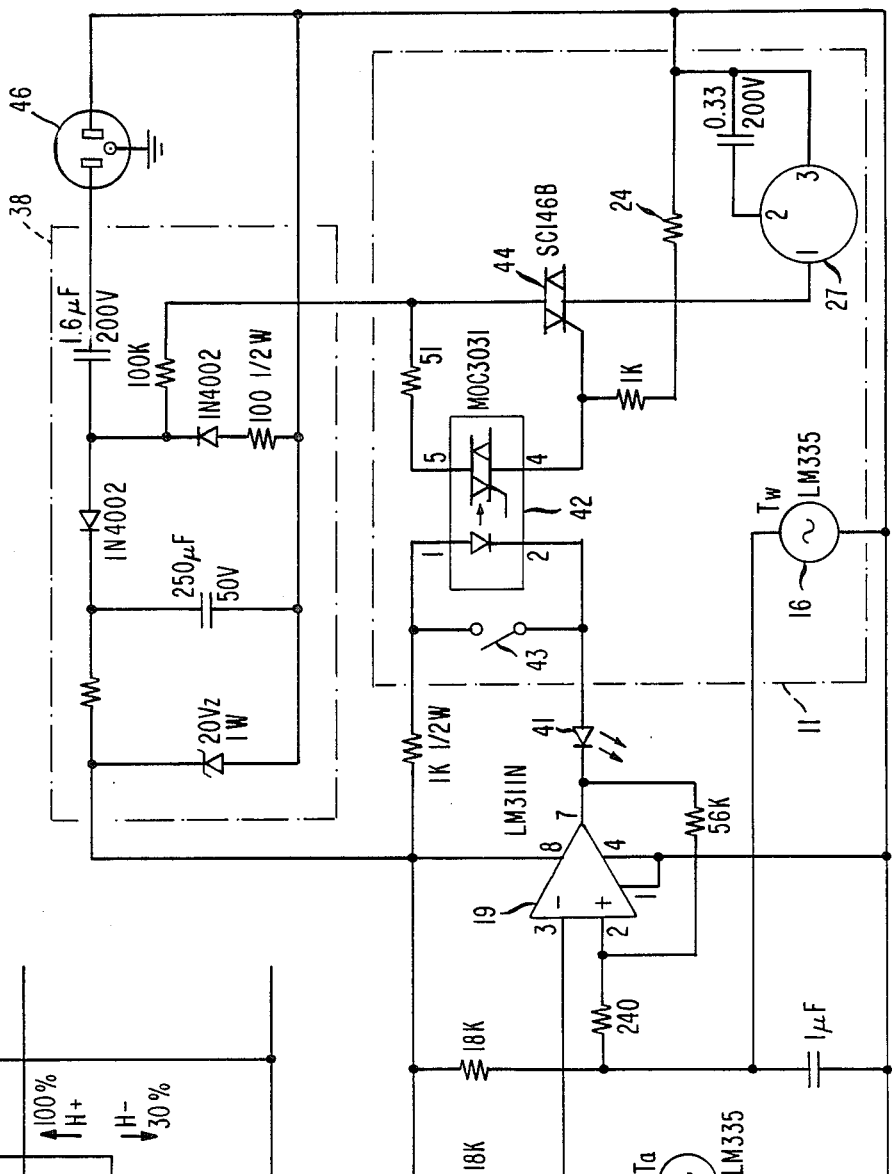
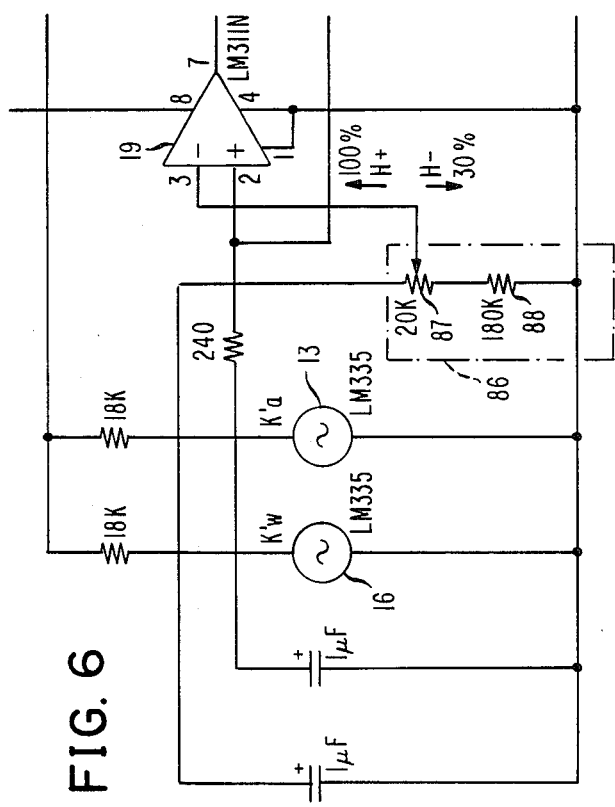
FIG. 2
FIG. 6

CONDENSATION CONTROLLER

BACKGROUND OF THE INVENTION

This invention relates to the control of condensation on the surface of a tank that is periodically supplied with liquid having a temperature lower by a certain amount than the temperature of the environment in which the tank is located. In particular, the invention relates to the control of condensation on a toilet tank.

The condensation of water on the outer surface of a toilet tank is well known as the source of many problems. The moist surface is conducive to the growth of fungi, and if the condensation is severe, the accumulated water may drip off, forming puddles on the floor and possibly loosening floor-covering material thereon. The water may even work down into the sub-flooring where it may eventually rot the wood. The problem is particularly acute in homes that are supplied with water that is especially cold, such as water directly from a well, which may have a temperature of about 51° to 56° F. Moreover, in normal operation of a toilet tank, all of the water in it is emptied out each time the toilet is flushed, and a whole new tankful is drawn in quickly.

The problem of condensation on a toilet tank has been attacked by Jones in U.S. Pat. No. 3,023,423 by providing a holding tank that receives the incoming water from the water main and holds it to allow it to warm up before it is transferred to the toilet tank. By the time the water reaches the toilet tank, it is supposed to be close enough to room temperature so that it will not cause condensation on the tank. However, the length of time the water is retained in the holding tank depends on the size of that tank and the rate at which water is drawn out of it. If the toilet is flushed several times in relatively rapid succession, as sometimes happens, the water may not stay in the holding tank long enough to heat up sufficiently. In any case, room must be provided for the holding tank, and extra plumbing must be used, which makes such a solution to the condensation problem particularly unsuitable for adding onto an existing system.

Toye (U.S. Pat. No. 2,659,898), Starr (U.S. Pat. No. 2,895,140), and Rom (U.S. Pat. No. 2,900,645) mix hot water with the cold water to avoid condensation. Their systems also require extra plumbing not normally connected to a toilet.

Bosworth (U.S. Pat. No. 2,527,115) electrically heats the water in the tank. The electrical current is passed through a thermostatically controlled switch that mechanically coacts with a float on a pivotally mounted arm. The heater is actuated before the tank fills up, and it could burn out if the flush valve stuck in the open position, as happens from time to time.

OBJECTS AND SUMMARY OF THE INVENTION

It is an object of this invention to provide means to control or avoid condensation on a tank that, from time to time, receives a quantity of liquid at a temperature low enough, in comparison with the environmental conditions adjacent the tank, to cause such condensation.

A further object is to provide a condensation controller that requires no extra plumbing beyond that ordinarily used in conjunction with a toilet.

Other objects will be apparent from the following description together with the accompanying drawings.

In a simple form of a condensation controller according to this invention, one electronic thermometer measures the temperature of the liquid in a tank and another measures the temperature outside, but close to, the tank, and the values of the two temperature signals are compared. If the temperature of the liquid is below that of the environment adjacent the tank, a heater immersed in the liquid is turned on. A liquid-level sensor is incorporated in the controller to prevent the heater from being turned on unless there is sufficient liquid in the tank, thereby preventing the heater from being burned out if it is energized when the valves controlling the flow of liquid out of or into the tank are not operating properly.

In a refinement of the invention, both the humidity and the temperature of the environment adjaceent the tank are measured, and the dewpoint temperature, which is a function of both of those parameters, is calculated. That temperature, rather than simply the temperature of the environment, is compared with the liquid temperature, and the heater is energized only if the liquid temperature is less then the dewpoint temperature. Unless the relative humidity of the environment is 100%, the dewpoint temperature is less than the ambient temperature, and heating the water in the tank only up to this lower temperature results in an energy cost saving, especially in climates where the humidity varies a lot.

Instead of computing the dewpoint temperature, the value of the signal representing the environmental temperature can be reduced by an arbitrary amount approximately equal to the reduction that would be calculated if the humidity were taken accurately into account.

BRIEF DESCRIPTION OF THE DRAWINGS

FIG. 2 is a schematic diagram of a simple condensation controller according to this invention.

FIG. 6 is a schematic circuit diagram of a modification of a part of the circuit in FIG. 2.

DETAILED DESCRIPTION OF THE INVENTION

Figure 1:
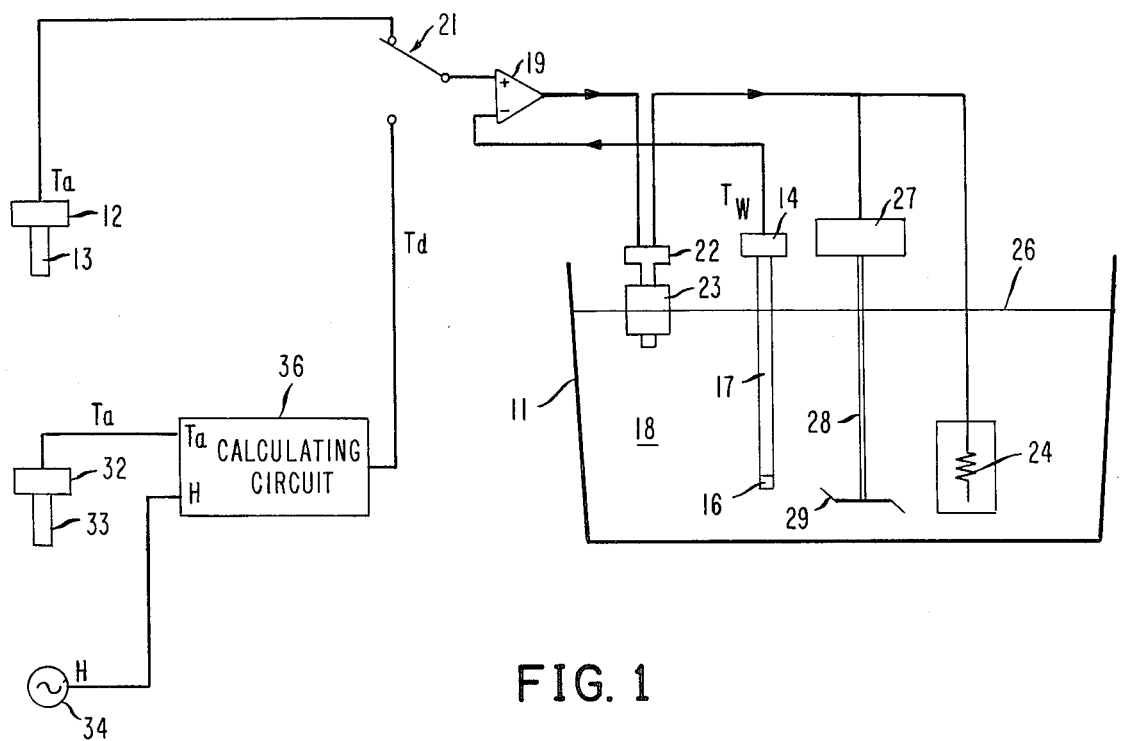
FIG. 1 is a block diagram illustrating a condensation controller having two modes of operation according to this invention.

The block diagram in FIG. 1 shows the basic components of a condensation controller for a tank 11 representative of a toilet tank. The invention is applicable to other tanks and to liquids other than water, but for clarity, it will be described in conjunction with toilet tanks. The circuit components include an electronic thermometer 12 that has a sensor 13 outside the tank to produce a first signal having a value that corresponds to the ambient temperature in the vicinity of the tank 11. Another electronic thermometer 14 has its sensor 16 housed in a metal pipe 17 that extends down into the water 18 within the tank to produce a second electrical signal that has a value corresponding to the temperature of the water in the tank. The thermometer 14 is connected to the inverting input signal terminal of a comparator 19, and the thermometer 12 is connected via one pole of a double-throw switch 21 to the non-inverting input terminal of the comparator, which compares the two signals by subtracting the value of the water temperature signal from that representing the ambient temperature. The simplified representation in this figure includes a liquid-level sensor in the form of a switch 22 that only closes when there is a sufficient quantity of water in the tank 11 to lift a float 23 to a certain position relative to the switch. Typically, such a switch is magneticlly operated, and the float has a magnet for that purpose. The switch is connected to a heater 24 to control the supply of heating current thereto.

In the embodiment described thus far, the comparator 19 produces an output signal when the water temperature falls below the ambient temperature, which is expected to happen each time the toilet is flushed and the tank 11 receives a new charge of water. Assuming the surface 26 of the water 18 is high enough for the heater 24 to be immersed and the switch 22 closed, the heater will receive heating current until the temperature of the water equals the ambient temperature. At that point, the output signal of the comparator 19 will reach zero, and no further current will be supplied to the heater 24. As a result of raising the temperature of the water to a value equal to the ambient temperature in the vicinity of the tank 11, there will be no condensation of water from the atmosphere onto the outer surface of the tank.

The part of the water 18 that will be heated first will naturally be the part immediately adjacent the heater 24. The resulting unaided movement of the heated water would eventually force all of the water to drift close enough to the heater 24 to be heated, but it would take a relatively long time to do so. There would be a significant temperature layering effect, with the water near the heater being raised to quite a high temperature before water in the most remote parts of the tank was heated at all. Layering is minimized in the embodiment in FIG. 1 by connecting a small motor 27 in parallel with the heater 24 to be turned on when current is supplied to the heater. The shaft 28 of the motor extends down into the water 18 and has a stirrer, or propellor, 29 at its end. Surprisingly little effort is needed to agitate the water 18 enough to prevent layering; I have found that hand rotation of a shaft that had only a small wire attached to its end was sufficient to bring the water temperature to within 2° F. of having a uniform value throughout the tank 11. In the absence of that small amount of agitation, the difference in temperature between the water immediately adjacent the heater and water at the coldest part of the tank 11 was as much as 40° F. A small synchronous, 60 Hz motor, such as the Crouzet Model 82510012, provides more than enough power to drive the stirrer 29.

It is desirable that the heater 24 always be under the surface of the water when heating current is flowing through the heater 24. For that reason, it should be as close to the bottom of the tank 11 as is convenient, given the necessity of accommodating plumbing components normally in the tank. As a further protection for the heater, in case the switch 22 should fail in the closed condition at the same time the flush valve for the toilet stuck in its open condition, keeping the tank 11 from filling up, it may be desirable to arrange the components so that the sensor 16 is close enough to the heater 24 to receive radiant heat from it, which would cause the comparator 19 to turn off the supply of heating current.

The operation of that part of the components in FIG. 1 described thus far is based on the unspoken assumption that the relative humidity in the vicinity of the tank is 100%, i.e., that the atmosphere contains as much water vapor as it can hold at the current ambient temperature. That condition is realistic, especially during humid days in the summer, but even at other times of the year, and with less humid conditions in other parts of the building, both the temperature and the humidity in a bathroom that has a tub, or, especially, a shower in it are likely to be high when the tub or shower is in use. Under such conditions, when the tank 11 is supplied with water at a low temperature, such as a temperature in the range of about 51° to 56° F., which is common for water drawn directly from a well, the problem of condensation on, and drippage from, the toilet tank 11 is at its most severe. If the air has a relative humidity of 100%, any localized reduction in the ambient temperature, such as at the surface of the tank 11, will cause water vapor in that localized area to condense into the liquid state.

The humidity in the vicinity of a toilet tank is not always 100%, and in such cases, it is not necessary to heat the water in the tank 11 to a temperature equal to the ambient temperature, but only to a somewhat lower temperature, called the dewpoint temperature, above which condensation would not take place. The dewpoint is the temperature at which the amount of water vapor then in the air is all that the air can hold without an increase in the temperature. If the surface of the tank is warmer than the dewpoint temperature, water vapor will not condense on it.

The computation of the dewpoint temperature $T_d$ in °F. for a given ambient temperature $T_a$, also in °F., and relative humidity H can be approximated by the following equation, which is accurate to within about 2% if the ambient temperature is within the range of about 70°–100° F. and the relative humidity is over about 30%:

$$T_d = T_a(0.65 + 0.0035 H). \tag{1}$$

When H=100 (meaning that the relative humidity is 100%), equation (1) reduces to:

$$T_d = T_a, \tag{2}$$

which is the condition assumed in the foregoing description of operation.

However, the apparatus in FIG. 1 includes components to take the humidity into account and to calculate the dewpoint temperature $T_d$ by means of equation (1). The temperature $T_d$ is then compared to the water temperature $T_w$ in the comparator 19 to cause the comparator to turn the heater 24 on only when the water temperature is less than the dewpoint.

Figure 3:
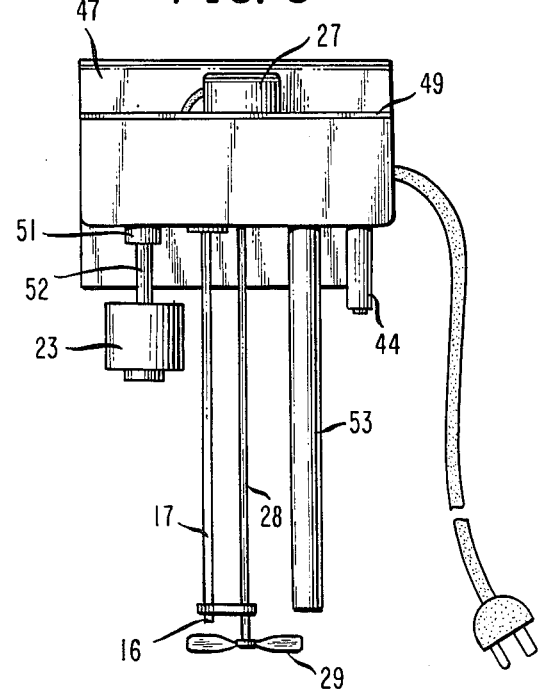
FIG. 3 is a front elevational view of a physical embodiment of this invention.

It should be mentioned that, although it is the temperature of the water 18 that is measured, it is the temperature of the outer surface of the tank 11 that must be above the dewpoint in order to prevent condensation. Consequently, the water temperature $T_w$ signal supplied to the comparator can be understood to be the temperature of the surface of the tank, which could be measured by affixing the temperature sensor 16 to the surface of the tank. The temperature of the water 18 is a close enough approximation to the temperature of the surface of the tank, and it is easy to support the sensor 16 from a framework common to the level switch 22, the motor 27, and the heater 24, as shown in FIG. 3.

The components in FIG. 1 for supplying to the comparator 19 a signal based on the dewpoint temperature are: an ambient temperature thermometer 32 having a temperature sensor 33, a humidity sensor 34, and a calculating circuit 36 for computing the value of the dewpoint temperature from the values of the ambient temperature signal and the humidity signal. The circuit also includes the switch 21, as if the complete circuit would be used to compare the water temperature signal sometimes with the ambient temperature signal and other times with the dewpoint signal. In fact, the circuit for actual use would not be so arranged but would be constructed to make one type of comparison or the other, not both, and there would be no switch 21. The provision for comparing the water temperature $T_w$ with either the ambient temperature $T_a$ or the dewpoint temperature $T_w$ at the flick of a switch is shown simply for convenience in illustrating both types of measurements in one circuit diagram and to point out differences between the two.

FIG. 2 shows one embodiment of the simpler system in which the ambient temperature signal is directly compared with the water temperature signal. The circuit includes a standard temperature sensor, type LM335Z, as the sensor 13. This sensor is connected electrically in series with a resistor 37 across a single-sided power supply 38 that has only a single output voltage: about 20 v.d.c., in this instance. A bypass capacitor 39 is connected across the sensor 13, which is connected to the inverting input circuit of a differential amplifier, such as an LM311N, which is the comparator 19. The sensor 16 that serves as the means to measure the temperature of the water in the tank 11 is connected to the non-inverting input terminal of the comparator 19, and the output circuit of the comparator is connected in series with a light-emitting diode (LED) 41 and with the input side of an MOC3031 optical coupler 42. A switch 43 is connected directly across the input terminals of the optical coupler. The output side of the optical coupler is connected to the gate of a triac 44, which, in this embodiment, is a type SC146B. The anode-cathode circuit of the triac is connected in series with an a.c. connector, to be connected to a source of alternating current, and with the heater. The motor 27 is connected across the heater.

In operation, the comparator 19 compares the values of the ambient temperature signal $T_a$ and the water temperature signal $T_w$ by subtracting the former from the latter. As long as the ambient temperature is higher than the water temperature, the output circuit of the comparator will draw current through the LED 41, indicating that the circuit is in its heating mode. The switch 43 serves essentially the same purpose as the switch 22 in FIG. 1: it controls whether or not current can be supplied to the heater 24. However, the switch 43 is normally closed, thus short-circuiting the input terminals of the optical coupler 42 except when there is enough water in the tank 11 to lift the float 23 to the position where it opens the switch. When that occurs, current can flow in the output circuit of the comparator 19 through the input side of the optical coupler 42, which causes the output side of the optical coupler to trigger the gate circuit of the triac 44 and make the high-current circuit of the triac conductive. Heating current can flow to the heater and operating current to the motor 27 through the triac.

When the water in the tank heats up enough to cause the value of the water temperature signal $T_w$ from the sensor 16 to be equal to the ambient temperature signal $T_a$ from the sensor 13, output current will cease to flow from the comparator 19 through the LED 41 and the input side of the optical coupler 42. As a result, the triac 44 will no longer be triggered, and current will cease to flow through the triac to the heater 24 and the motor 27. The output current from the comparator 19 cannot reverse and keep the heater in operation, which would overheat the water.

Figure 4:
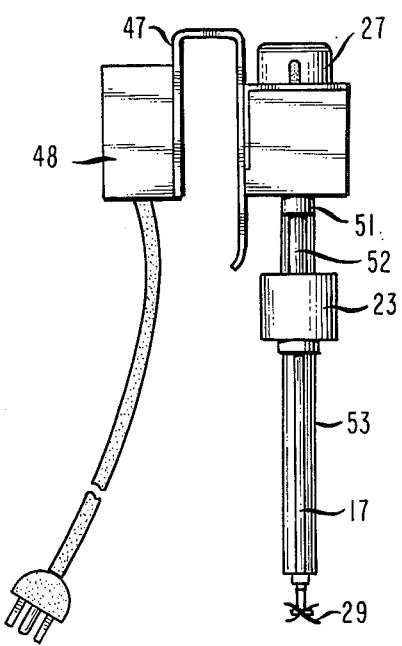
FIG. 4 is a side view of the embodiment in FIG. 3.

FIGS. 3 and 4 show one arrangement for the components in FIG. 2. FIG. 4 shows a generally U-shaped support 47 suitable for slipping over the rim of the tank 11. The support has an enclosure 48 attached to one side of it to hang on the outside of the tank and a bracket 49 on the other side to be within the confines of the tank but above the highest water level. The ambient temperature sensing means 13 is located in the enclosure, as are the comparator 19 and the power supply 38. The triac can be mounted in the enclosure 48, but the triac heats up when it is in operation, and it is desirable to mount it on the bracket 49 in such a way that the triac is at least partly in the water to be cooled thereby.

FIG. 3 shows an enclosure 51 for the switch 43. This enclosure is mounted on the bracket 49 and includes a vertical rod 52 on which the float 23 is retained so that it can move up and down without leaving the proximity of the switch. The heater 24 is enclosed in a vertical cylinder 53 mounted on the bracket. This positioning of the heater keeps it away from the flushing mechanism, which is not shown in the drawings but is present in one form or another in all toilet tanks. However, the vertical position of the heater 24 in the cylinder 53 means that the heater cannot be turned on until the tank 11 is almost full. That is why the rod 52 is short: the float 23 must be lifted by the buoyancy of the water only when the tank is nearly full and the water level is higher than the heating element in the cylinder 53. The motor 27 is mounted on the bracket with the shaft 28 extending down between the tubular housing 17 for the water temperature sensor 16 and the cylinder 53. The stirrer 29 is thus close to both the heater and the temperature sensor and is in position to disperse the heated water throughout the tank.

Figure 5:
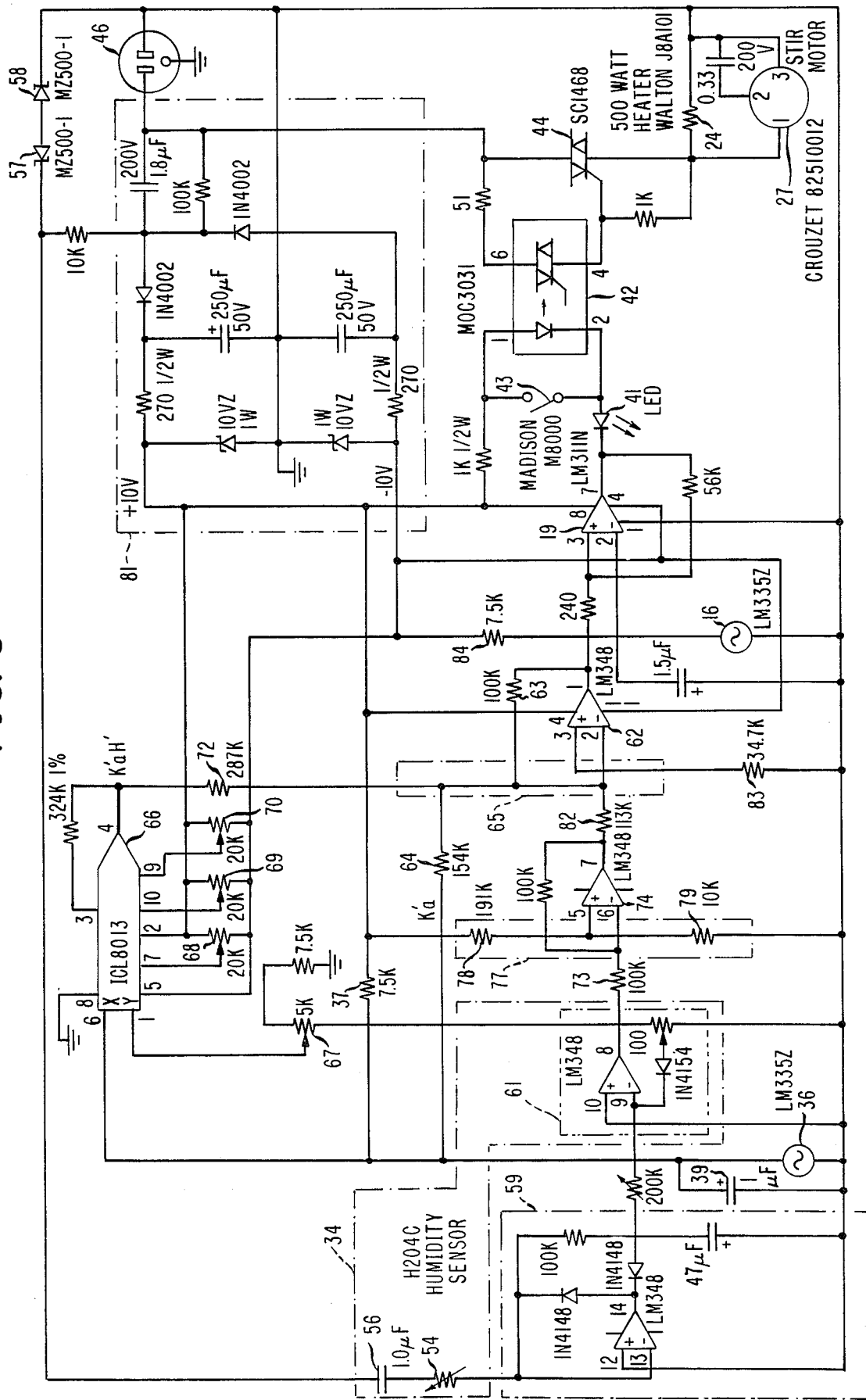
FIG. 5 is a schemtaic circuit diagram of another embodiment of this invention.

The circuit in FIG. 5 includes means for taking the humidity into account in controlling condensation on the surface of the tank. It shows in more detail the system represented in FIG. 1 when the arm of the switch 21 is shifted to the other position so as to connect the dewpoint temperature calculating means 36 to the comparator 19.

The means 34 for producing a signal that has a value corresponding to the ambient humidity of the atmosphere in the vicinity of the tank 11 (FIG. 1) includes a type H204C humidity sensor 54. Such sensors must be connected to an a.c. power source, and in this embodiment the sensor 54 is connected by a capacitor 56 to a 5 v. peak-to-peak supply regulated by two zener diodes 57 and 58. The sensor 54 is, essentially, a resistor, the resistance of which varies as a function of the humidity. However, the function is not linear but is approximated by the following equation:

$$H = 1.072 - 0.286 \log(R/1000) \qquad (3)$$

where:

H' is used to indicate that it is the absolute humidity, not the relative humidity H, and R is the resistance of the sensor 54.

The sensor 54 is connected to an ideal peak rectifier 59, the gain of which varies proportionally with changes in the resistance of the sensor due to changes in the humidity. As shown in equation (3), the absolute humidity H' is a logarithmic function of the resistance of the sensor, and so the rectified output signal of the rectifier 59 is passed through a logarithmic amplifier 61 to obtain the absolute humidity signal H'. The relationship between the absolute humidity H' and the relative humidity H is:

$$H' = H/100 \tag{4}$$

The temperature sensor 33 produces an output signal that is a linear function of the temperature in °K., the relationship between the signal value and the temperature being 10 mv. per 1° K., or 0.01 v. per 1° K. Therefore, at 273° K., which is approximately 0° C., the output voltage of the temperature sensor is 2.73 v.

Equation (1) was in terms of °F. Since the output signal of the temperature sensor varies according to the Kelvin scale, equation (1) must be transformed accordingly. The following equation gives the relationship between readings in the Fahrenheit and Kelvin scales:

$$F. = 9/5\, K. - 459.4 \tag{5}$$

Substituting (with appropriate subscripts) equation (5) into equation (1) gives:

$$9/5\, K_d - 459.4 = (9/5\, K_a - 459.4)(0.65 + 0.0035\, H) \tag{6}$$

Therefore, $$K_d = K_a(0.65 + 0.0035\, H) + 5/9(459.4)(0.35)(1 - 0.01\, H) \tag{7}$$

or $$K_d \approx 0.65\, K_a + 0.0035\, K_a H + 89(1 - 0.01\, H) \tag{8}$$

Since the temperature signal from the sensor 33 changes only 0.01 v. per 1° K., equation (8) can be changed to accommodate that relationship, using the symbol K' to indicate that the revised equation deals with electrical signals rather than with the atmospheric conditions represented by those signals. For the same reason, the humidity H in equation (8) will be changed to the humidity signal H' by substituting equation (4) into equation (8):

$$K'_d \approx 0.65 K'_a + 0.35 K'_a H' + 0.89(1 - H') \tag{9}$$

As indicated in equation (9), three signals must be added together to calculate the dewpoint temperature signal $K'_d$. These signals are combined in a summing amplifier 62 that has a feedback resistor 63 with a resistance of 100K. The signal 0.65 $K'_a$ is obtained by applying the ambient temperature signal $K'_a$ to the summing amplifier through a resistor 64 that has a resistance of 154K, so that the signal is attenuated by the ratio 100/154, or approximately 0.65.

The product $K'_a H'$ is obtained by applying those signals from the sources 33 and 34, respectively, to the two inputs of a type ICL8013 multiplier 66. The humidity signal H' is applied through a gain-trimming potentiometer 67, and the multiplier has three offset adjustment potentiometers 68-70. The output signal $K'_a H'$ of the multiplier is applied to the summing amplifier 62 through a resistor 72 that has a resistance of 287K, so that the product signal is attenuated by the ratio of 100/287, or about 0.35, at the summing node 65, which is also the input terminal of the summing amplifier.

The third signal, which is the attenuated value of the difference between a constant signal value, in this case, 1, and the value H' of the humidity signal, is obtained by applying the humidity signal through a resistor 73 having a resistance of 100K to the inverting input terminal of a differential amplifier 74. The differential amplifier has a feedback resistor with a resistance of 100K, so that the humidity signal H' has unity gain in that amplifier. The constant signal value from which it is subtracted is determined by a voltage divider 77, which is made up of a 191K resistor 78 and a 10K resistor 79 and is connected between ground and the +10 v.d.c. terminal of a power supply 81. The output signal of the amplifier 76 has the desired value of (1−H') and is attenuated by the ratio of 100/113, which is close to the desired value of 0.89, by being passed through a resistor 82, the resistance of which is 113K, to the summing node 65. The summing node is connected to the inverting input terminal of the amplifier 62, and the non-inverting input terminal is connected to ground through an offset correction resistor that has a resistance of 34.7K, which is equal to the parallel resistance of the resistors 64, 72, and 82.

Because the signals representing the three terms on the righthand side of equation (9) are applied to the inverting terminal of the summing amplifier 62, the output signal of that amplifier, which has the magnitude of the dewpoint temperature signal $K'_d$, has a negative value and is, thus, $-K'_d$. Instead of passing this signal through another inverter before comparing it with the water temperature signal, which will be recognized as having the magnitude $K'_w$ rather than the magnitude $T_w$ used in the circuits in FIGS. 1 and 2, the negative dewpoint signal $-K'_d$ is simply applied to the non-inverting input terminal of the comparator 19, and the negative value of the water temperature signal $-K'_w$ is obtained by connecting the resistor 84 in series with the sensor 16 across the negative part of the power supply 81 and is connected to the inverting terminal of the comparator. In this figure, the comparator is properly connected to both the positive and negative terminals of the power supply. Connecting the dewpoint temperature signal $-K'_d$ to the non-inverting input terminal and the water temperature signal $-K'_w$ to the inverting input terminal allows current to flow through the input side of the optical coupler 42 and through the LED 41 only while the dewpoint temperature signal $-K'_d$ is negative with respect to the water temperature signal $-K'_a$. The heater 24 is controlled in the same way in FIG. 5 as in FIG. 2.

FIG. 6 shows a simple circuit for adjusting the ambient temperature signal $K'_a$ manually to take the humidity somewhat into account. The only difference between the circuits in FIGS. 2 and 6 is that, in the latter, the sensor 13 is not connected directly to the inverting input terminal of the comparator 19 but is connected across a voltage divider 86 consisting of a potentiometer 87 and a resistor 88, and the arm of the potentiometer is connected to the inverting terminal of the comparator. Thus, the value of the signal applied to the inverting terminal is equal to or less than the value of the ambient temperature signal $K'_a$. The potentiometer may be calibrated in percent humidity from 30% to 100%, and it may be adjusted by the user in accordance with what the humidity is known to be, or it may be adjusted to limit the usage of the heater 24. The resistor is included to limit the minimum setting of the potentiometer to a value corresponding to 30% humidity, and the resistances of the potentiometer 87 and the resistor 88 are calculated in accordance with the fact that the ambient temperature signal $K'_a$ is a function of °K. According to the computation, the potentiometer 87 has a resistance of 20K and the resistor 88 has a resistance of 180K. The comparator 19 in FIG. 6 can be connected to the heater 24 in exactly the same way as the comparator 19 in FIG. 2.

What is claimed is:

1. A condensation controller for a liquid storage tank, said controller comprising:
    (a) first temperature measuring means to produce a first electrical output signal as an ambient temperature signal having a value that is a function of the ambient temperature of the environment adjacent the storage tank;
    (b) humidity measuring means to produce a second electrical output signal as a humidity signal having a value that is a function of the humidity of the environment adjacent the tank;
    (c) calculating means connected to the first temperature measuring means and to the humidity measuring means to produce a dewpoint temperature output signal, the value of which is a function of the dewpoint temperature of the environment adjacent the tank;
    (d) second temperature measuring means to produce a third electrical output signal as a liquid temperature signal having a value proportional to the temperature of the liquid;
    (e) heating means to heat the liquid;
    (f) comparison means connected to the calculating means and to the second temperature measuring means and to the heating means to cause the heating means to be energized to heat the liquid when the value of the dewpoint temperature output signal is greater than the value of the liquid temperature signal.

2. The condensation controller of claim 1 in which the value of the dewpoint temperature output signal is $T_d$ in °F. and is calculated by:

$$T_d = T_a(0.65 + 0.0035\ H),$$

where:
$T_a$ is the value of the ambient temperature in °F., and
H is the relative humidity of the environment adjacent the tank and is between 30% and 100%.

3. The condensation controller of claim 1 in which the first temperature measuring means comprises first temperature sensor means to produce the ambient temperature signal, the value of which is $K'_a$ and is a substantially linear function of the ambient temperature in °K. adjacent the tank.

4. The condensation controller of claim 3 in which the humidity measuring means comprises a humidity sensor and amplifier means connected thereto to generate the humidity signal, the value H' of which is a substantially linear function of the absolute humidity of the environment adjacent the tank.

5. The condensation controller of claim 4 in which the calculating means comprises:
    (a) a multiplier circuit connected to the first temperature measuring means and to the humidity measuring means to multiply at least a predetermined fractional part of the value $K'_a$ of the ambient temperature signal of the first temperature measuring means by at least a predetermined fractional part of the value H' of the humidity signal;
    (b) differential circuit means connected to the humidity measuring means to subtract, from a constant signal value, the value H' of the humidity signal; and
    (c) summing circuit means connected to:
        (i) the multiplier circuit,
        (ii) the first temperature measuring means, and
        (iii) the differential circuit means
    to add a first predetermined fractional part of the value $K'_a$ of the ambient temperature signal to a second predetermined fractional part of the product of the value $K'_a$ of the ambient temperature signal and of the value H' of the humidity signal and to a third predetermined fractional part of the difference between the constant signal value and the value H' of the humidity signal.

6. The condensation controller of claim 5 in which the first predetermined fractional part is between about 0.63 and about 0.67, the second predetermined fractional part is between about 0.33 and about 0.37, and the third predetermined fractional part is between about 0.86 and about 0.92, and the constant signal value is about 1.

7. The condensation controller of claim 6 in which the first predetermined fractional part is about 0.65, the second predetermined fractional part is about 0.35, and the third predetermined fractional part is about 0.89.

8. The condensation controller of claim 4 in which the humidity sensor comprises resistance means, the resistance of which varies as a logarithmic function of absolute humidity.

9. The condensation controller of claim 8 in which the amplifier means connected to the humidity sensor is a logarithmic amplifier.

10. A condensation controller for a liquid storage tank, said controller comprising:
    (a) first temperature measuring means for producing a first signal having a value functionally related to the temperature of the environment of the storage tank;
    (b) second temperature measuring means for producing a second signal having a value functionally related to the temperature of the liquid in the tank;
    (c) comparison means connected to the first temperature measuring means and to the second temperature measuring means to compare the first signal with the second signal to produce a control signal having a value functionally related to the difference between the first and second signals;
    (d) heating means in the tank;
    (e) controlling means connected to the heating means to control the operation thereof and connected to the comparison means to be actuated by the control signal to cause the heating means to heat the liquid to to a temperature sufficient to reduce the value of the control signal below a predetermined amount; and
    (f) stirring means in the tank and connected to the comparison means to be actuated thereby to stir the liquid while the heating means is energized.

11. The condensation controller of claim 10 in which the stirring means comprises a motor connected in parallel with the heating means to operate simultaneously therewith.

12. The condensation controller of claim 11 in which the controlling means comprises:
  (a) a triac connected in series with the heating means and located within the tank to be cooled by the liquid; and
  (b) gating means coupling the comparison means to the gate of the triac to cause the high-current path therethrough to be conductive when the magnitude of the first signal is greater than the magnitude of the second signal.

13. The condensation controller of claim 10 comprising modifying means connected to at least one of the temperature measuring means to modify one of the first and second signals relative to the other of the first and second signals.

14. The method of preventing water from condensing on the outer surface of a tank containing a liquid that is initially sufficiently colder than the environment adjacent the tank to cause such condensation of water vapor in the atmosphere, said method comprising the steps of:
  (a) measuring the temperature of the environment adjacent the tank;
  (b) measuring the temperature of the water in the tank;
  (c) measuring the humidity of the environment adjacent the tank;
  (d) calculating the dewpoint of the environment adjacent the tank based on the humidity and the temperature of the environment adjacent the tank;
  (e) comparing the temperature of the liquid with the dewpoint temperature; and
  (f) heating the liquid in the tank as long as the temperature of the liquid in the tank is below the dewpoint temperature.

* * * * *